US012812672B2

(12) United States Patent
Wu et al.

(10) Patent No.: US 12,812,672 B2
(45) Date of Patent: Nov. 24, 2026

(54) COMMUNICATION METHOD AND APPARATUS

(71) Applicant: HUAWEI TECHNOLOGIES CO., LTD., Shenzhen (CN)

(72) Inventors: Yedan Wu, Shanghai (CN); Chunhua You, Shanghai (CN); Tingting Geng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 566 days.

(21) Appl. No.: 18/327,907

(22) Filed: Jun. 2, 2023

(65) Prior Publication Data

US 2023/0354421 A1 Nov. 2, 2023

Related U.S. Application Data

(63) Continuation of application No. PCT/CN2020/133544, filed on Dec. 3, 2020.

(51) Int. Cl.

*H04W 74/0808* (2024.01)
*H04W 24/04* (2009.01)
*H04W 28/02* (2009.01)

(52) U.S. Cl.

CPC ....... *H04W 74/0808* (2013.01); *H04W 24/04* (2013.01); *H04W 28/0236* (2013.01)

(58) Field of Classification Search

CPC ........... H04W 74/0808; H04W 74/002; H04W 24/04; H04W 28/0236; H04W 72/27

See application file for complete search history.

(56) References Cited

U.S. PATENT DOCUMENTS

2018/0184475 A1* 6/2018 Babaei .................. H04W 16/14
2020/0351940 A1* 11/2020 Deogun ............ H04W 74/0808

(Continued)

FOREIGN PATENT DOCUMENTS

CN 107371168 A 11/2017
WO 2020223692 A1 11/2020

OTHER PUBLICATIONS

3GPP TS 36.423 V16.3.0 (Sep. 2020),3rd Generation Partnership Project;Technical Specification Group Radio Access Network;Evolved Universal Terrestrial Radio Access Network(E-UTRAN);X2 application protocol (X2AP)(Release 16), total 332 pages.

(Continued)

*Primary Examiner* — Robert C Scheibel

(57) ABSTRACT

A communication method and apparatus resolves a problem that a resource usage status reported by a network device is inaccurate. The method includes: a first network device receives resource status information from a second network device, where the resource status information includes LBT-related resource information; and the first network device determines a resource usage status of the second network device based on the resource status information. In the foregoing manner, the first network device may determine a resource that is to be released by the second network device, a resource that may be occupied, and the like. In this way, the first network device may perform conversion on the resource usage status of the second network device, to obtain an accurate resource usage status, and in particular, have more accurate estimation on an estimated future resource usage status.

16 Claims, 7 Drawing Sheets

(56) References Cited

U.S. PATENT DOCUMENTS

| | | | | |
|---|---|---|---|---|
| 2023/0044648 | A1* | 2/2023 | Centonza | H04W 36/22 |
| 2023/0308949 | A1* | 9/2023 | Centonza | H04W 28/0942 |
| 2023/0345532 | A1* | 10/2023 | Khirallah | H04W 74/0816 |
| 2023/0422076 | A1* | 12/2023 | Lunardi | H04W 28/0958 |
| 2024/0349334 | A1* | 10/2024 | Babaei | H04W 74/0808 |

OTHER PUBLICATIONS

3GPP TS 38.321 V16.2.1 (Sep. 2020),3rd Generation Partnership Project;Technical Specification Group Radio Access Network;NR;Medium Access Control (MAC) protocol specification(Release 16), total 154 pages.
3GPP TS 38.423 V16.3.0 (Sep. 2020),3rd Generation Partnership Project;Technical Specification Group Radio Access Network;NG-RAN;Xn application protocol (XnAP)(Release 16), total 451 pages.
Extended European Search Report dated Oct. 23, 2023, issued for European Application No. 20963924.4 (8 pages).

* cited by examiner

COMMUNICATION METHOD AND APPARATUS

CROSS-REFERENCE TO RELATED APPLICATIONS

This application is a continuation of International Application No. PCT/CN2020/133544, filed on Dec. 3, 2020, the disclosure of which is hereby incorporated by reference in its entirety.

TECHNICAL FIELD

This disclosure relates to the field of communication technologies, and in particular, to a communication method and apparatus.

BACKGROUND

In a current communication mechanism, for example, in long term evolution (LTE) and new radio (NR), a resource usage status may be exchanged between network devices to optimize network mobility parameter configuration.

A network device 1 may obtain a resource usage status of a network device 2 in the following manners: In one manner, the network device 1 sends a mobility change request message to the network device 2, and may determine the resource usage status of the network device 2 after receiving a response message sent by the network device 2. In another manner, the network device 1 sends a resource status request message to the network device 2, and obtains the resource usage status of the network device 2 after receiving a resource status update message sent by the network device 2.

However, because an enhanced mobility scheme, such as a listen before talk (LBT) mechanism, is introduced into a new communication protocol, an existing resource interaction mechanism cannot accurately reflect resource usage statuses of network devices. As a result, the network devices cannot accurately learn of the resource usage statuses of each other. Further, an error is prone to occur when the network devices adjust mobility parameters based on the resource usage statuses of each other, affecting a mobility load balance (MLB) effect.

SUMMARY

This disclosure provides a communication method and apparatus, to resolve a problem that a resource usage status reported by a network device is inaccurate.

According to a first aspect, embodiments of this disclosure provide a communication method, including: A first network device receives resource status information from a second network device, where the resource status information includes LBT-related resource information; and the first network device determines a resource usage status of the second network device based on the resource status information.

In embodiments of this disclosure, when reporting the resource status information to the first network device, the second network device may indicate an LBT-related resource, so that the first network device determines, based on the resource status information reported by the second network device, a resource that may be occupied by the second network device, and the like. In this way, the first network device may perform conversion on the resource usage status of the second network device, to obtain an accurate resource usage status, and in particular, have more accurate estimation on an estimated future resource usage status. When the first network device performs mobility load balance based on information such as a resource that is to be released by the second network device and a resource that may be occupied, accuracy of load balance may be improved. For example, the first network device may perform conversion on indicator values such as a radio resource, a quantity of RRC connections, and a quantity of activated UEs (It may also be understood as a quantity of UEs with data transmission) of the second network device based on the LBT-related resource of the second network device, so that a degree of falsely high indicators such as the radio resource, the quantity of RRC connections, and the quantity of activated UEs of the second network device may be reduced, the resource usage status of the second network device may be more accurately learned, and a handover threshold of the network device may be properly adjusted.

In a possible implementation, the LBT-related resource information includes at least one of the following information: LBT limitation information of the second network device and LBT failure information of the second network device, where the LBT limitation information indicates an LBT impact on an available resource of the second network device, and the LBT failure information indicates an LBT failure status. In an LBT mechanism, because a plurality of terminal devices in a cell simultaneously initiate data transmission, only some terminal devices succeed in LBT contention during LBT contention, and the other terminal devices continue to perform LBT contention in a subsequent time period after the LBT contention fails. This case may cause a subsequent surge in resource usage. For example, as the terminal devices move, a large quantity of terminal devices simultaneously contend for a resource to perform data transmission with a network. In the foregoing implementation, the LBT limitation information and the LBT failure information are indicated, so that the first network device may have a more accurate evaluation on the future resource usage status of the second network device, and the first network device may more accurately obtain a load of the second network device. This improves accuracy of network load balance.

In a possible implementation, the LBT limitation information is a comparison relationship between an offered resource of a first cell and an offered resource of a cell in which an LBT mechanism does not exist, and the first cell is a cell in which the LBT mechanism exists in the second network device. In the foregoing implementation, the first network device may perform conversion on a resource of the second network device based on the LBT limitation information, to have a more accurate evaluation on the future resource usage status of the second network device, and the first network device may more accurately obtain a load of the second network device. This improves accuracy of network load balance.

In a possible implementation, the LBT failure information indicates a level at which continuous LBT failures occur under the second network device; or the LBT failure information includes: a quantity of times that continuous LBT failures occur under the second network device; or the LBT failure information indicates a level at which an LBT failure occurs under the second network device; or the LBT failure information includes: a quantity of times that an LBT failure occurs under the second network device. In the foregoing implementation, the first network device may determine a conversion coefficient based on the LBT failure information, to perform conversion on the resource of the second network device, and have a more accurate evaluation on the future resource usage status of the second network device.

In a possible implementation, the LBT failure information further includes at least one of the following information: a received signal strength indicator measured by the second network device, a received signal strength indicator measured by a terminal device that accesses the second network device, a channel occupation average value, and a probability that channel occupation is higher than the channel occupation average value. In the foregoing implementation, the first network device may more accurately obtain channel details when LBT fails, so that the first network device may further learn a status of an LBT channel.

In a possible implementation, before the first network device receives the resource status information from the second network device, the method further includes: The first network device sends a request message to the second network device, where the request message is used to request the second network device to measure the resource usage status, the request message carries first information, and the first information indicates to measure the LBT-related resource of the second network device. In the foregoing implementation, the LBT-related resource is used as a type of measured resource, so that the second network device may measure the LBT-related resource based on an indication of the first network device.

In a possible implementation, the LBT-related resource information includes: LBT-related resource information of N types of resources, where N is an integer greater than 0, and LBT-related resource information of a first-type resource in the N types of resources includes at least one of the following information: LBT limitation information of the first-type resource and LBT failure information of the first-type resource, where the LBT limitation information of the first-type resource indicates a degree of an LBT impact on a first-type resource of the second network device, and the LBT failure information indicates an LBT failure status of the first-type resource of the second network device. In the foregoing implementation, an LBT factor is considered for each type of resource, so that accuracy of a resource measurement report may be improved.

In a possible implementation, the LBT limitation information of the first-type resource is a comparison relationship between a first-type resource that can be offered by a first cell and a first-type resource that can be offered by a cell in which an LBT mechanism does not exist. In the foregoing implementation, the first network device may perform conversion on the first-type resource of the second network device based on the LBT limitation information, to have a more accurate evaluation on a future first-type resource usage status of the second network device.

In a possible implementation, the LBT failure information of the first-type resource indicates a level at which continuous LBT failures occur on the first-type resource of the second network device; or the LBT failure information indicates a quantity or a proportion of first-type resources on which continuous LBT failures occur under the second network device; or the LBT failure information indicates a level at which an LBT failure occurs on the first-type resource of the second network device; or the LBT failure information indicates a quantity or a proportion of first-type resources on which an LBT failure occurs under the second network device. In the foregoing implementation, the first network device may determine a conversion coefficient of the first-type resource based on the LBT failure information of the first-type resource, to perform conversion on the first-type resource of the second network device, and have a more accurate evaluation on a future first-type resource usage status of the second network device.

In a possible implementation, before the first network device receives the resource status information from the second network device, the method further includes: The first network device sends a request message to the second network device, where the request message is used to request the second network device to measure the resource usage status, the request message carries second information, and the second information indicates the second network device to measure LBT-related resources of the N types of resources. In the foregoing implementation, the first network device indicates, through the request message, the second network device to consider the LBT factor when measuring the N types of resources, so that the second network device may measure the LBT-related resources of the N types of resources and based on an indication of the first network device.

In a possible implementation, the N types of resources include at least one of the following resources: an air interface resource, a transport layer resource, a hardware resource, an available capacity of a slice, a quantity of activated terminal devices, a quantity of RRC connections, and an overall available resource.

In a possible implementation, a granularity of the resource status information is a cell granularity, a network device granularity, a beam granularity, a slice granularity, or a bandwidth part (BWP) granularity.

According to a second aspect, embodiments of this disclosure provide a communication method, including: A second network device performs resource measurement; and the second network device sends resource status information to a first network device, where the resource status information includes listen before talk LBT-related resource information.

In embodiments of this disclosure, when reporting the resource status information to the first network device, the second network device may indicate an LBT-related resource, so that the first network device determines, based on the resource status information reported by the second network device, a resource that may be occupied by the second network device, and the like. In this way, the first network device may perform conversion on the resource usage status of the second network device, to obtain an accurate resource usage status, and in particular, have more accurate estimation on an estimated future resource usage status. When the first network device performs mobility load balance based on information such as a resource that is to be released by the second network device and a resource that may be occupied, accuracy of load balance may be improved. For example, the first network device may perform conversion on indicator values such as a radio resource, a quantity of RRC connections, and a quantity of activated UEs (It may also be understood as a quantity of UEs with data transmission) of the second network device based on the LBT-related resource of the second network device, so that a degree of falsely high indicators such as the radio resource, the quantity of RRC connections, and the quantity of activated UEs of the second network device may be reduced, the resource usage status of the second network device may be more accurately learned, and a handover threshold of the network device may be properly adjusted.

In a possible implementation, the LBT-related resource information includes at least one of the following information: LBT limitation information of the second network device and LBT failure information of the second network device, where the LBT limitation information indicates an LBT impact on an available resource of the second network device, and the LBT failure information indicates an LBT failure status. In an LBT mechanism, because a plurality of terminal devices in a cell simultaneously initiate data transmission, only some terminal devices succeed in LBT contention during LBT contention, and the other terminal devices continue to perform LBT contention in a subsequent time period after the LBT contention fails. This case may cause a subsequent surge in resource usage. For example, as the terminal devices move, a large quantity of terminal devices simultaneously contend for a resource to perform data transmission with a network. In the foregoing implementation, the LBT limitation information and the LBT failure information are indicated, so that the first network device may have a more accurate evaluation on the future resource usage status of the second network device, and the first network device may more accurately obtain a load of the second network device. This improves accuracy of network load balance.

In a possible implementation, the LBT limitation information is a comparison relationship between an offered resource of a first cell and an offered resource of a cell in which an LBT mechanism does not exist, and the first cell is a cell in which the LBT mechanism exists in the second network device. In the foregoing implementation, the first network device may perform conversion on a resource of the second network device based on the LBT limitation information, to have a more accurate evaluation on the future resource usage status of the second network device, and the first network device may more accurately obtain a load of the second network device. This improves accuracy of network load balance.

In a possible implementation, the LBT failure information indicates a level at which continuous LBT failures occur under the second network device; or the LBT failure information includes: a quantity of times that continuous LBT failures occur under the second network device; or the LBT failure information indicates a level at which an LBT failure occurs under the second network device; or the LBT failure information includes: a quantity of times that an LBT failure occurs under the second network device. In the foregoing implementation, the first network device may determine a conversion coefficient based on the LBT failure information, to perform conversion on the resource of the second network device, and have a more accurate evaluation on the future resource usage status of the second network device.

In a possible implementation, the LBT failure information further includes at least one of the following information: a received signal strength indicator measured by the second network device, a received signal strength indicator measured by a terminal device that accesses the second network device, a channel occupation average value, and a probability that channel occupation is higher than the channel occupation average value. In the foregoing implementation, the first network device may more accurately obtain channel details when LBT fails, so that the first network device may further learn a status of an LBT channel.

In a possible implementation, before the second network device performs resource measurement, the method further includes: The second network device receives a request message from the first network device, where the request message is used to request the second network device to measure the resource usage status, the request message carries first information, and the first information indicates to measure an LBT-related resource of the second network device. In the foregoing implementation, the LBT-related resource is used as a type of measured resource, so that the second network device may measure the LBT-related resource based on an indication of the first network device.

In a possible implementation, the LBT-related resource information includes: LBT-related resource information of N types of resources, where N is an integer greater than 0, and LBT-related resource information of a first-type resource in the N types of resources includes at least one of the following information: LBT limitation information of the first-type resource and LBT failure information of the first-type resource, where the LBT limitation information of the first-type resource indicates a degree of an LBT impact on a first-type resource of the second network device, and the LBT failure information indicates an LBT failure status of the first-type resource of the second network device. In the foregoing implementation, an LBT factor is considered for each type of resource, so that accuracy of a resource measurement report may be improved.

In a possible implementation, the LBT limitation information of the first-type resource is a comparison relationship between a first-type resource that can be offered by a first cell and a first-type resource that can be offered by a cell in which an LBT mechanism does not exist. In the foregoing implementation, the first network device may perform conversion on the first-type resource of the second network device based on the LBT limitation information, to have a more accurate evaluation on a future first-type resource usage status of the second network device.

In a possible implementation, the LBT failure information of the first-type resource indicates a level at which continuous LBT failures occur on the first-type resource of the second network device; or the LBT failure information indicates a quantity or a proportion of first-type resources on which continuous LBT failures occur under the second network device; or the LBT failure information indicates a level at which an LBT failure occurs on the first-type resource of the second network device; or the LBT failure information indicates a quantity or a proportion of first-type resources on which an LBT failure occurs under the second network device. In the foregoing implementation, the first network device may determine a conversion coefficient of the first-type resource based on the LBT failure information of the first-type resource, to perform conversion on the first-type resource of the second network device, and have a more accurate evaluation on a future first-type resource usage status of the second network device.

In a possible implementation, before the second network device performs resource measurement, the method further includes: The second network device receives a request message from the first network device, where the request message is used to request the second network device to measure the resource usage status, the request message carries second information, and the second information indicates the second network device to measure LBT-related resources of the N types of resources. In the foregoing implementation, the first network device indicates, through the request message, the second network device to consider the LBT factor when measuring the N types of resources, so that the second network device may measure the LBT-related resources of the N types of resources and based on an indication of the first network device.

In a possible implementation, the N types of resources include at least one of the following resources: an air interface resource, a transport layer resource, a hardware resource, an available capacity of a slice, a quantity of activated terminal devices, a quantity of RRC connections, and an overall available resource.

In a possible implementation, a granularity of the resource status information is a cell granularity, a network device granularity, a beam granularity, a slice granularity, or a BWP granularity.

In a possible implementation, the second network device may further receive LBT information from a terminal device, where the LBT information includes a quantity of LBT failures in a time periodicity. In the foregoing implementation, the terminal device reports the quantity of LBT failures to the second network device, so that the second network device may better determine an LBT failure status.

In a possible implementation, before the receiving LBT information from a terminal device, the method further includes: sending a first message to the terminal device, where the first message indicates to report the quantity of LBT failures in the time periodicity.

In a possible implementation, the LBT information further includes at least one of the following information: a received signal strength indicator and a channel occupation average value. In the foregoing manner, the second network device may better learn about the LBT failure status of the terminal device.

In a possible implementation, the LBT information is carried in RRC signaling. Integrity of the LBT information may be ensured in the foregoing manner.

According to a third aspect, embodiments of this disclosure provide a communication method, including: recording each listen before talk LBT failure; and sending LBT information to a second network device, where the LBT information includes a quantity of LBT failures in a time periodicity. In embodiments of this disclosure, a terminal device reports the quantity of LBT failures to the second network device, so that the second network device may better determine an LBT failure status.

In a possible implementation, before the sending LBT information to a second network device, the method further includes: receiving a first message from the second network device, where the first message indicates to report the quantity of LBT failures in the time periodicity.

In a possible implementation, the first message carries a first indication, and the first indication is a first state, where when the first indication is the first state, the first indication indicates to report the quantity of LBT failures in the time periodicity, and when the first indication is a second state, the first indication indicates to report continuous LBT failures. In the foregoing implementation, the terminal device may support two LBT reporting mechanisms.

In a possible implementation, the LBT information further includes at least one of the following information: a received signal strength indicator and a channel occupation average value. In the foregoing manner, the second network device may better learn about the LBT failure status of the terminal device.

In a possible implementation, the sending LBT information to a second network device includes: sending the LBT information to the second network device through RRC signaling. Integrity of the LBT information may be ensured in the foregoing manner.

In a possible implementation, when the LBT information is sent to the second network device, the quantity of LBT failures in the time periodicity is less than a threshold. In the foregoing implementation, even if the quantity of LBT failures does not exceed the threshold, the terminal device may also report the quantity of LBT failures to the second network device.

In a possible implementation, if the quantity of LBT failures in the time periodicity is greater than or equal to the threshold, a record of the quantity of LBT failures is kept. In the foregoing implementation, when the quantity of LBT failures exceeds the threshold, the terminal device may not clear the quantity of LBT failures, so that the quantity of LBT failures may be recorded more accurately.

According to a fourth aspect, this disclosure provides a communication apparatus. The apparatus may be a communication device, or may be a chip or a chip set in the communication device, where the communication device may be a network device or may be a terminal device. The apparatus may include a processing unit and a transceiver unit. When the apparatus is the communication device, the processing unit may be a processor, and the transceiver unit may be a transceiver. The apparatus may further include a storage unit, and the storage unit may be a memory. The storage unit is configured to store instructions, and the processing unit executes the instructions stored in the storage unit, to perform a corresponding function in the first aspect, the second aspect, or the third aspect. When the apparatus is a chip or a chip set in the communication device, the processing unit may be a processor, and the transceiver unit may be an input/output interface, a pin, a circuit, or the like. The processing unit executes the instructions stored in the storage unit, to perform the corresponding function in the first aspect, the second aspect, or the third aspect. The storage unit may be a storage unit (for example, a register or a cache) in the chip or chip set, or may be a storage unit located outside the chip or chip set in the communication device (for example, a read-only memory, a random access memory, or the like).

According to a fifth aspect, an apparatus is provided, including: a processor, a communication interface, and a memory. The communication interface is configured to transmit information and/or a message and/or data between the apparatus and another apparatus. The memory is configured to store computer execution instructions. When the apparatus runs, the processor executes the computer execution instructions stored in the memory, the apparatus is enabled to perform the method in the first aspect, the second aspect, or the third aspect.

According to a sixth aspect, this disclosure further provides a communication system, where the system includes the first network device in any embodiment of the first aspect and the second network device in any embodiment of the second aspect.

In a possible implementation, the system may further include the terminal device in any embodiment of the third aspect.

According to a seventh aspect, this disclosure further provides a computer-readable storage medium, where the computer-readable storage medium stores instructions, and when the instructions are run on a computer, the computer is enabled to perform the method in the first aspect, the second aspect, or the third aspect.

According to an eighth aspect, this disclosure further provides a computer program product including instructions. When the computer program product is run on a computer, the computer is enabled to perform the method in the first aspect, the second aspect, or the third aspect.

DESCRIPTION OF EMBODIMENTS

To facilitate understanding of embodiments of this disclosure, the following describes terms or backgrounds related to embodiments of this disclosure.

1. MLB

In an existing communication mechanism, for example, in LTE and NR, a resource usage status is exchanged between network devices to optimize network mobility parameter configuration.

Content of the exchange may include a transport layer resource, a hardware usage status, a radio load, an overall resource status, and the like.

Figure 1:
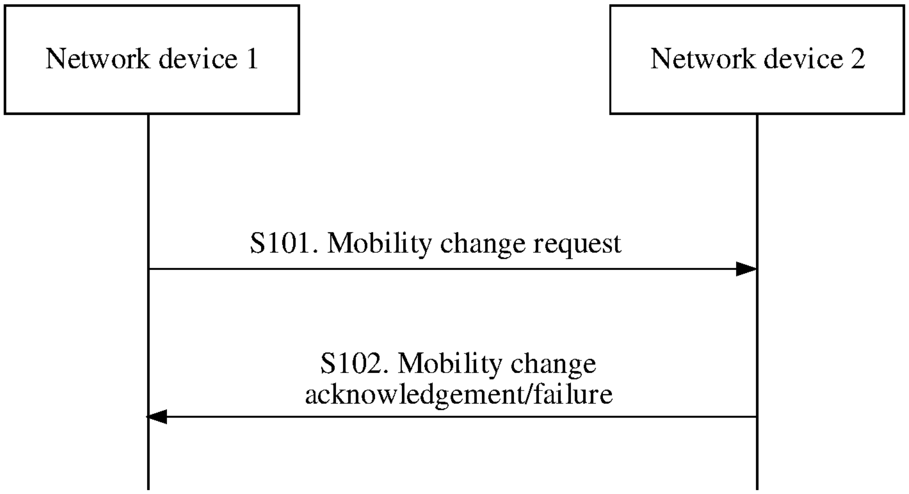
FIG. 1 is a schematic flowchart of negotiating a mobility parameter between network devices according to an embodiment of this disclosure.

The following uses Xn as an example. There are two procedures related to MLB in TS 36.423 and TS 38.423. In one procedure, a mobility parameter between network devices is negotiated when the mobility changes. As shown in FIG. 1, a process of negotiating the mobility parameter between the network devices is as follows.

S101. A network device 1 sends a mobility change request to a network device 2.

S102. The network device 2 sends a mobility change acknowledgment/failure to the network device 1.

There may be many causes for a mobility change. One of the causes is that after two network devices exchange the resource usage status, one network device indicates, based on a resource usage status of another network device, the another network device to change a handover trigger threshold (Handover Trigger Change). For example, the network device 1 finds that the network device 2 is idle. In this case, a mobility change request message is sent to indicate the network device 2 to increase the handover trigger threshold, so that more terminal devices remain in the network device 2 instead of being handed over to the network device 1. If the network device 2 accepts a request of the network device 1, the network device 2 returns the mobility change acknowledge. If the network device 2 does not accept the request of the network device 1, the network device 2 returns a mobility change failure including a cause and an adjustment range. After receiving the adjustment range, the network device 1 may initiate a next request.

Figure 2:
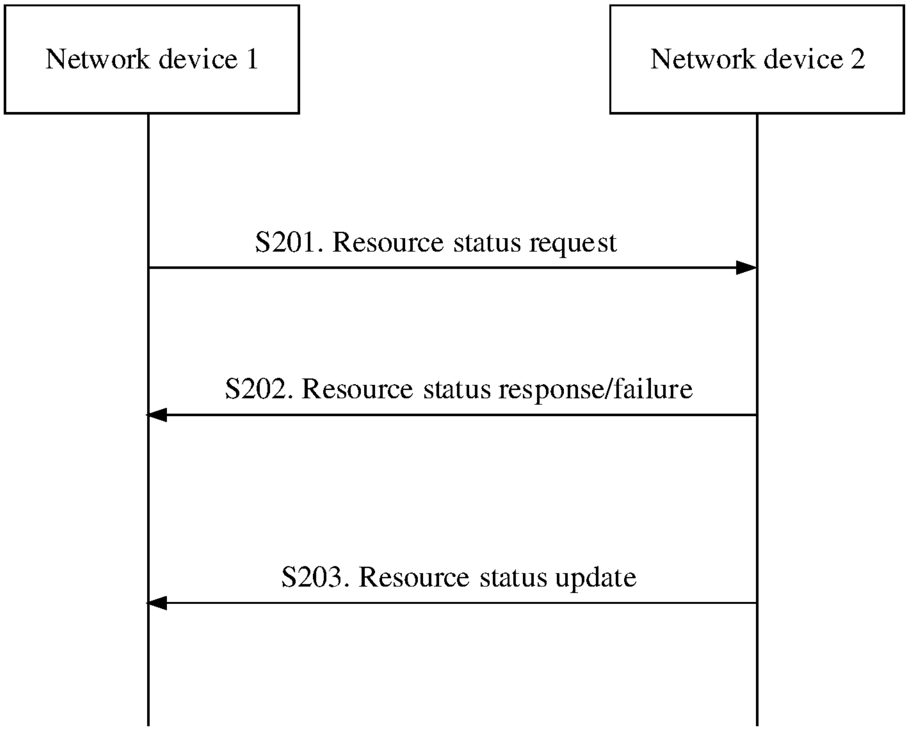
FIG. 2 is a schematic flowchart of exchanging a resource usage status by a network device according to an embodiment of this disclosure.

In another process, adjacent network devices exchange the resource usage status when a resource status report is initialized. As shown in FIG. 2, a process in which the network devices exchange the resource usage status is as follows.

S201. A network device 1 sends a resource status request) to a network device 2.

S202. The network device 2 sends a resource status response/failure to the network device 1.

S203. After completing resource measurement, the network device 2 sends a resource status update to the network device 1.

If the network device 1 wants to know a resource usage status of the network device 2, the network device 1 may send a resource status request message to indicate the network device 2 to start/stop/increase various resources (some cells). If the network device 2 may successfully start to measure all required resources, the network device 2 returns the resource status response. If the network device 2 cannot start to measure one required resource, the network device 2 returns a resource status failure. After measuring various resources required by the network device 1, the network device 2 sends a measurement report to the network device 1.

2. Unlicensed Frequency Band

Based on TS 38.321 in a 3GPP protocol, a spectrum of some cells is unlicensed, to be specific, the spectrum does not belong to a frequency band of an operator. For example, common Wi-Fi in life operates on the unlicensed spectrum.

Using NR as an example, a cell that operates on the unlicensed frequency band may be referred to as a new radio-unlicensed (NR-U) cell.

In the NR-U cell, communication devices such as a terminal device or a network device may contend for using a resource of the unlicensed frequency band by using a listen before talk (LBT) (or referred to as detection before sending) mechanism.

Generally, LBT is performed at a granularity of a channel (for example, 20 MHz). Before sending a signal (for example, a data signal) on a channel (for example, denoted as a first channel), the communication device may first detect whether the first channel is idle, for example, whether it is detected that a nearby communication device is occupying the first channel to send a signal. The detection process may be referred to as clear channel assessment (CCA) or a channel access process.

There are at least two channel access processes, which are denoted as a first-type channel access process and a second-type channel access process.

The first-type channel access process (which may also be referred to as a fixed duration-based channel access process) may be: energy detection based on the fixed duration. For a specific bandwidth, for example, 20 MHz, if signal energy received by the communication device (the communication device may be the terminal device or the network device) in the fixed duration is less than or equal to a first preset threshold, it is considered that the channel is idle, so that the communication device may use the idle channel to transmit data; and otherwise, it is considered that the channel is busy, so that the communication device does not use the busy channel to transmit data.

The second-type channel access process (which may also be referred to as a backoff-based channel access process) may be: energy detection based on a backoff mechanism. For a specific bandwidth, a window is defined. The window defines a range of a quantity of detected slots, and the communication device randomly selects a value A from the window (or a value range). After the communication device detects at least A idle slots for energy detection, it is considered that the channel is idle, so that the communication device may use the idle channel to transmit data; and otherwise, it is considered that the channel is busy, so that the communication device does not use the busy channel to transmit data. The idle energy detection means that signal energy received in the fixed duration is less than or equal to a second preset threshold. The first preset threshold and the second preset threshold may be predefined, for example, predefined in a protocol. This is not limited. In addition, there is no limitation relationship between the first preset threshold and the second preset threshold, and the first preset threshold and the second preset threshold may be the same or different.

Two results may be obtained when the channel access process is performed: The channel access process is completed and the channel access process is not completed. There are a plurality of time domain start locations in a time-frequency resource used for data transmission. If it is determined that the channel is idle before any time domain start location, it may be considered that the channel access process is completed. If it is determined that the channel is busy before all time domain start locations, it may be considered that the channel access process is not completed.

The NR-U may meet any one of the following scenarios.

Scenario A: Carrier Aggregation (CA) is Performed Between the NR-U Cell and an NR Cell.

In the scenario, the NR-U cell is used as a secondary cell (SCell), the NR cell is used as a primary cell (PCell), the NR-U cell operates on the unlicensed frequency band, and the NR cell operates on the licensed frequency band. The NR-U cell may perform uplink transmission and downlink transmission, or may perform only downlink transmission. A core network connected to the NR-U cell is a 5G core network (5G-CN).

Scenario B: Dual Connectivity (DC) is Performed Between the NR-U Cell and an LTE Cell.

In the scenario, the NR-U cell is used as the primary SCG cell (PSCell), the LTE cell is used as the PCell, and the LTE cell operates on the licensed frequency band. A core network connected to an LTE PCell is an evolved packet core (EPC), or an LTE PCell may be connected to both an EPC and the 5G-CN. In this case, the LTE PCell may be preferentially connected to the 5G-CN.

Scenario C: An Independent NR-U Cell. Both Uplink Transmission and Downlink Transmission of the NR-U Cell Operate on the Unlicensed Frequency Band.

In the scenario, the NR-U may operate independently, and a core network connected to the NR-U is the 5G-CN.

Scenario D: The Independent NR-U Cell. The Uplink Transmission of the NR-U Cell Operates on the Licensed Frequency Band, and the Downlink Transmission of the NR-U Cell Operates on the Unlicensed Frequency Band.

In the scenario, the core network connected to the NR-U cell is the 5G-CN.

Scenario E: DC is Performed Between the NR-U Cell and the NR Cell.

In the scenario, the NR-U cell is used as the primary SCG cell (PSCell), the NR cell is used as the PCell, and the NR cell operates on the licensed band. A core network of the PCell is the 5G-CN.

It should be understood that the scenario A to the scenario E are merely example descriptions, and shall not constitute any limitation on embodiments of this disclosure.

3. Primary cell (PCell): A master cell group (MCG) cell operates on a primary frequency band. A UE performs an initial connection establishment process or a connection reestablishment process with the PCell.
4. Secondary cell (SCell): If the UE is configured with a CA function, the SCell is a cell that provides an additional radio resource in addition to a special cell (SC).
5. Special cell: The special cell is the primary cell. For a dual connectivity operation, the special cell refers to a primary cell of the MCG or a primary/secondary cell of the SCG.
6. Primary and secondary cells (PSCell): For the dual connectivity operation, the primary and secondary cells are cells to which random access is sent when the UE performs synchronous reconfiguration.
7. Secondary cell group (SCG): For a UE configured with dual connectivity, a subset of serving cells that include the PSCell and another secondary cell.
8. Serving cell: For a UE in a radio resource control (RRC) connected status, if CA/DC is not configured, there is only one serving cell. If the CA/DC is configured, the serving cell includes the special cell and all SCells.
9. Continuous LBT failures: A quantity of times that the LBT failure occurs in the terminal device in a measurement periodicity exceeds a threshold.
10. Received signal strength indicator (RSSI): A measurement value that is obtained by the terminal device that measures signal strength on a channel. Optionally, in one measurement periodicity, the terminal device may measure the signal strength on the channel at a specific time interval, and report an average value of the RSSI in the measurement periodicity to the network device.
11. Channel occupancy (CO): A proportion of the RSSI that exceeds a threshold to the RSSI measured in one measurement periodicity. The measurement periodicity may be configured by the network device.

It should be noted that with continuous development of technologies, terms in embodiments of this disclosure may change, but all changes fall within the protection scope of this disclosure.

To make objectives, technical solutions, and advantages of embodiments of this disclosure clearer, the following further describes embodiments of this appl disclosure ication in detail with reference to the accompanying drawings.

Figure 3:
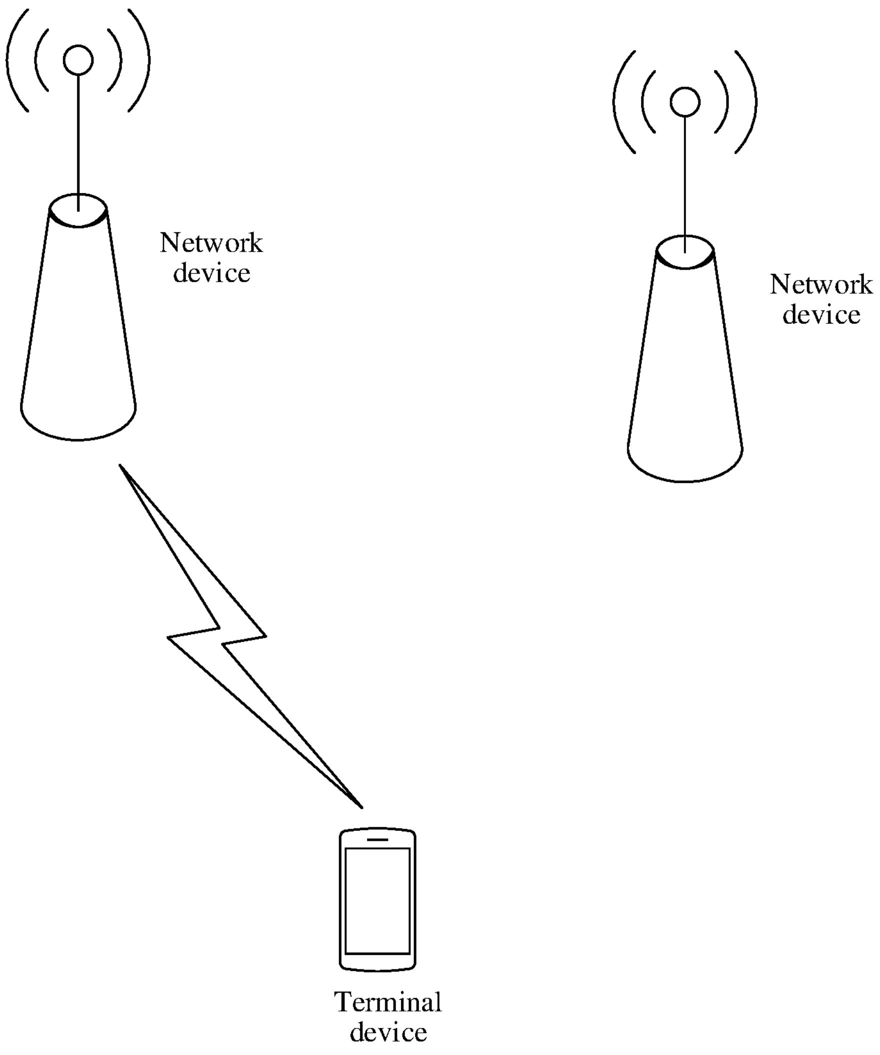
FIG. 3 is a schematic diagram of an architecture of a communication system according to an embodiment of this disclosure.

The communication method provided in embodiments of this disclosure may be applied to the communication system shown in FIG. 3. The communication system may include two network devices, and may further include a terminal device. The two network devices may be connected based on an interface such as Xn, X2, F1, or E1. It should be understood that FIG. 3 is merely an example description, and does not specifically limit a quantity of terminal devices and a quantity of network devices included in the communication system.

The communication method provided in this disclosure may be applied to various communication systems, for example, may be an internet of things (IoT) system, a narrow band internet of things (NB-IoT) system, or an LTE system, or may be a fifth generation (5G) communication system, or may be an LTE and 5G hybrid architecture, or may be a 5G NR system, a new communication system emerging in future communication development, or the like.

The terminal device involved in embodiments of this disclosure is a user-side entity configured to receive or transmit a signal. The terminal device may be a device that provides voice and/or data connectivity for a user, for example, a handheld device or a vehicle-mounted device with a wireless connection function. The terminal device may also be another processing device connected to a wireless modem. The terminal device may communicate with a radio access network (RAN). The terminal device may also be referred to as a wireless terminal, a subscriber unit, or a subscriber station, a mobile station, a mobile, a remote station, an access point, a remote terminal, an access terminal, a user terminal, a user agent, a user device, or a user equipment (UE), or the like. The terminal device may be a mobile terminal, for example, a mobile phone (or referred to as a "cellular" phone) and a computer having a mobile terminal, for example, a portable, pocket-sized, handheld, computer-built-in, or vehicle-mounted mobile apparatus that exchanges language and/or data with the radio access network. For example, the terminal device may further be a device such as a personal communication service (PCS) phone, a cordless phone, a session initiation protocol (SIP) phone, a wireless local loop (WLL) station, a personal digital assistant (PDA). Common terminal devices include: a mobile phone, a tablet computer, a notebook computer, a palmtop computer, a mobile internet device (MID), and a wearable device such as a smartwatch, a smart band, or a pedometer. However, embodiments of this disclosure are not limited thereto.

The network device involved in embodiments of this disclosure is an entity on a network side configured to transmit or receive a signal. For example, the network device may be an evolved NodeB (evolved NodeB, eNB or e-NodeB) in LTE, may be a new radio controller (NR controller), may be a gNodeB (gNB) in a 5G system, may be a central unit, may be a new radio base station, may be a radio remote module, may be a micro base station, may be a relay, may be a distributed unit (distributed unit), or may be a transmission reception point (TRP), a transmission point (TP), or any other radio access device. However, embodiments of this disclosure are not limited thereto. The network device may cover one or more cells.

Figure 4:
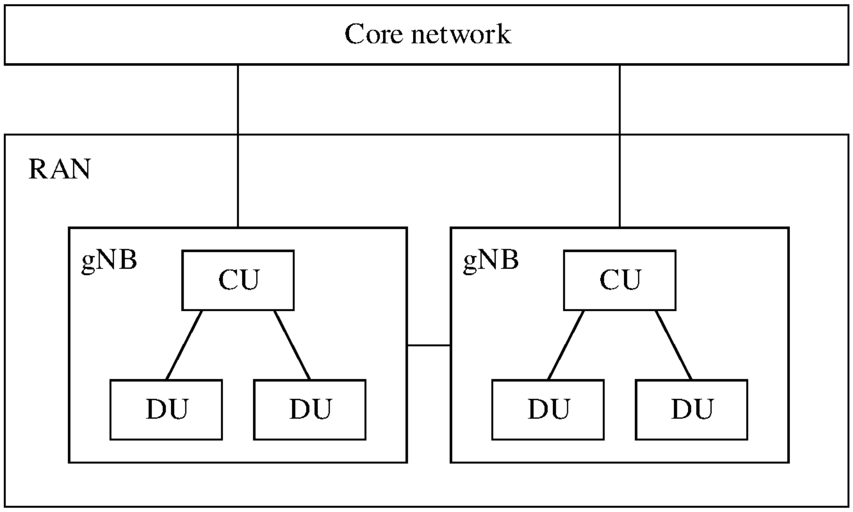
FIG. 4 is a schematic diagram of a structure of an access network device according to an embodiment of this disclosure.
Figure 5:
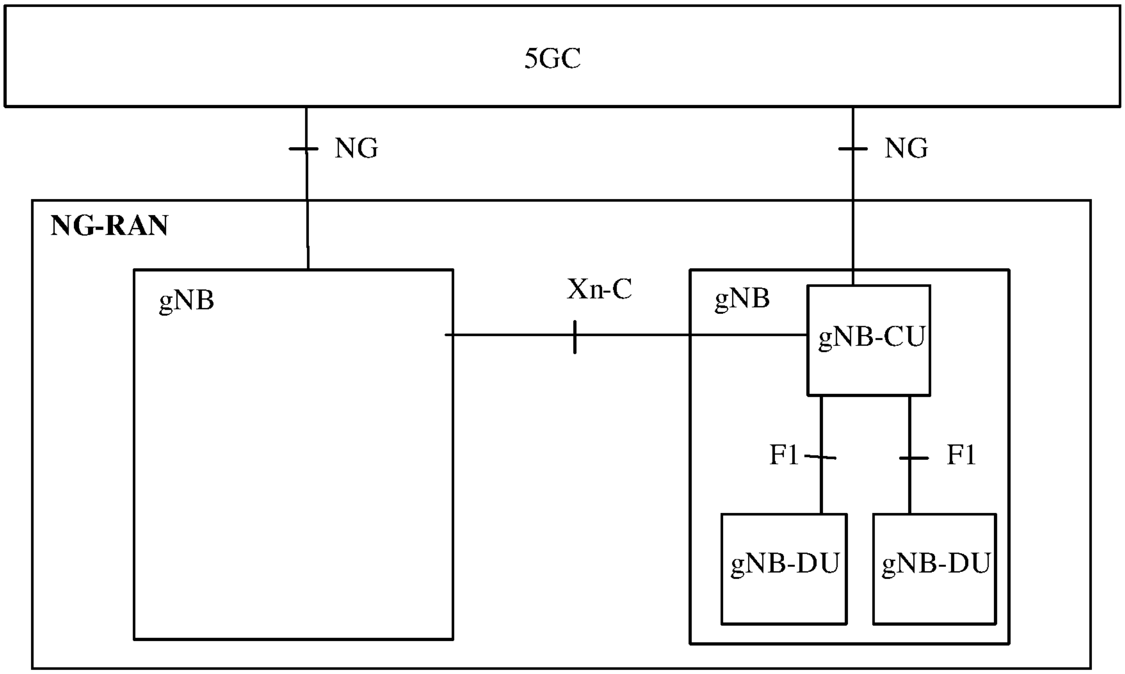
FIG. 5 is a schematic diagram of a structure of another access network device according to an embodiment of this disclosure.

For example, the access network device may be split into two parts based on a protocol stack function: a central unit (CU) and a distributed unit (DU). One access network device may include one CU and at least one DU, as shown in FIG. 4. The CU is connected to the at least one DU, and may be configured to manage or control the at least one DU. In the structure, protocol layers of the access network device in the communication system may be split. Some protocol layer functions are implemented in the CU, remaining some or all protocol layer functions are distributed and implemented in the DU, and the DU is controlled by the CU in a central manner. For example, the access network device is a gNB. A protocol layer of the gNB includes a radio resource control (RRC) layer, a service data adaptation protocol (SDAP) layer, a packet data convergence protocol (PDCP) layer, a radio link control (RLC) layer, a media access control (MAC) sublayer, and a physical layer. For example, the CU may be configured to implement functions of the RRC layer, the SDAP layer, and the PDCP layer, and the DU may be configured to implement functions of the RLC layer, the MAC layer, and the physical layer. Protocol stacks included in the CU and the DU are not specifically limited in embodiments of this disclosure. The CU and the DU may be connected by using an F1 interface, the CU is connected to another access network device by using an Xn interface, and the CU is connected to a 5G core network (5GC) by using an NG interface, as shown in FIG. 5.

Figure 6:
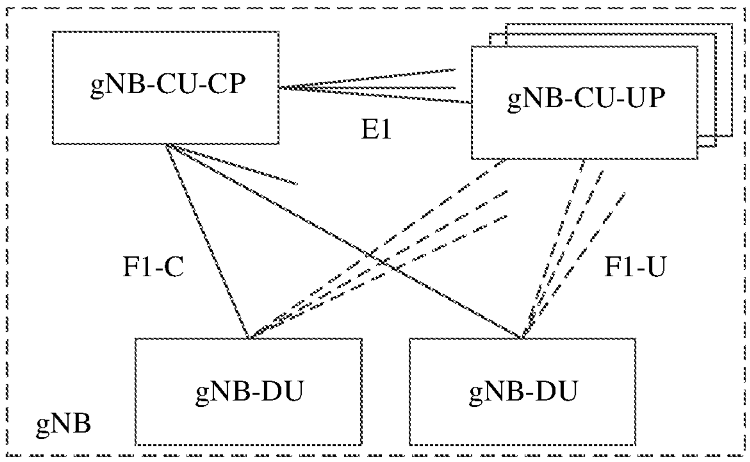
FIG. 6 is a schematic diagram of a structure of an access network device according to an embodiment of this disclosure.

For example, the CU in embodiments of this disclosure may be further divided into one CU-control plane (CU-CP) network element and at least one CU-user plane (CU-UP) network element. The CU-CP may be used for control plane management, and the CU-UP may be used for user plane data transmission. An interface between the CU-CP and the CU-UP may be an E1 interface. An interface between the CU-CP and the DU may be an F1-C interface, and is used for control plane signaling transmission. An interface between the CU-UP and the DU may be an F1-U interface, and is used for user plane data transmission. The CU-UP may be connected to the CU-UP through an Xn-U interface, to perform user plane data transmission. For example, using a gNB as an example. A structure of the gNB may be shown in FIG. 6.

The network device involved in embodiments of this disclosure may be the CU, or may be the DU, or may be the CU-CP, or may be the CU-UP.

A system architecture and a service scenario described in embodiments of this disclosure are intended to describe the technical solutions in embodiments of this disclosure more clearly, and do not constitute any limitation on the technical solutions provided in embodiments of this disclosure. A person of ordinary skill in the art may know that with evolution of the network architecture and emergence of a new service scenario, the technical solutions provided in embodiments of this disclosure are also applicable to similar technical problems.

In a current communication mechanism, for example, in LTE and NR, a resource usage status may be exchanged between network devices to optimize network mobility parameter configuration.

A network device 1 may obtain a resource usage status of a network device 2 in the following manner: In one manner, the network device 1 sends a mobility change request message to the network device 2, and may determine the resource usage status of the network device 2 after receiving a response message sent by the network device 2. In another manner, the network device 1 sends a resource status request message to the network device 2, and obtains the resource usage status of the network device 2 after receiving a resource status update message sent by the network device 2. However, because an enhanced mobility scheme, such as an LBT mechanism, is introduced into a new communication protocol, an existing resource interaction mechanism cannot accurately reflect the resource usage status of the network device. As a result, the network devices cannot accurately learn resource usage statuses of each other. Further, an error is prone to occur when the network devices adjust mobility parameters based on the resource usage statuses of each other. This affects an MLB effect.

Based on this, embodiments of this disclosure provide a communication method and apparatus. The communication method may be a resource status indication method, a resource status obtaining method, a mobility load balance method, a mobility load balance parameter indication method, a mobility load balance parameter obtaining method, or the like, to resolve a problem that a resource usage status reported by a network device is inaccurate. The method and apparatus are based on a same inventive concept. The method and apparatus have similar principles for resolving problems. Therefore, for implementations of the apparatus and method, refer to each other. Details are not described herein again.

It should be understood that in embodiments of this disclosure, “at least one” refers to one or more, and “a plurality of” refers to two or more. “And/or” describes an association relationship for associated objects and represents that three relationships may exist. For example, A and/or B may represent: only A exists, both A and B exist, and only B exists, where A and B may be singular or plural. The character “/” generally indicates an “or” relationship between the associated objects. “At least one of the following items” or a similar expression means any combination of these items, including a single item or any combination of a plurality of items. For example, at least one of a, b, or c may represent a, b, c, a and b, a and c, b and c, or a, b, and c, where a, b, and c may be singular or plural.

It should be understood that the terms used in this disclosure are for the purpose of describing specific embodiments only and are not intended to limit this disclosure. The singular forms of “a” and “the” used in this disclosure and the appended claims are intended to include the plural forms as well, unless the context clearly indicates otherwise.

In addition, it should be understood that although the terms such as “first”, “second”, and “third” may be used in this disclosure to describe various information, the information should not be limited to these terms. These terms are merely used to distinguish between information of the same type. For example, without departing from the scope of this disclosure, first information may also be referred to as second information, and similarly, second information may also be referred to as first information. Depending on the context, for example, the word “if” used herein may be interpreted as “while”, “when”, or “in response to determining”.

The following specifically describes the communication method provided in this disclosure with reference to the accompanying drawings.

Figure 7:
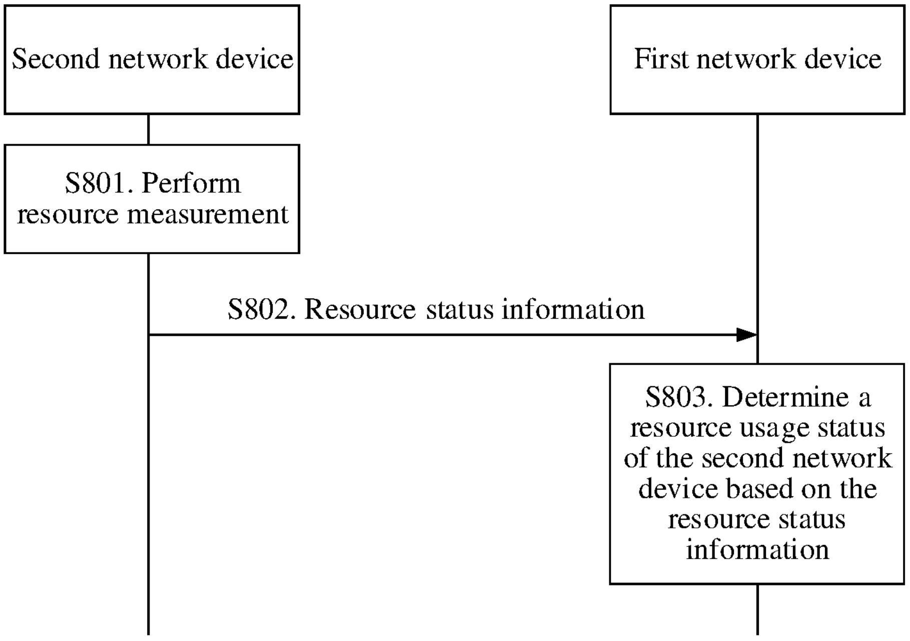
FIG. 7 is a schematic flowchart of a communication method according to an embodiment of this disclosure.

Embodiment 1: Embodiments of this disclosure provide a communication method. As shown in FIG. 7, the method may specifically include the following steps.

S801. A second network device performs resource measurement to obtain resource status information, where the resource status information includes LBT-related resource information.

For example, the second network device may perform resource measurement by using a network device as a granularity, to be specific, the second network device may collect statistics on each resource of the second network device. Therefore, a granularity of the obtained resource status information is a network device granularity. For example, if the second network device is a base station, the granularity of the resource status information is a base station granularity. For another example, if the second network device is a CU, the granularity of the resource status information is a CU granularity. For another example, if the second network device is a DU, the granularity of the resource status information is a DU granularity.

Alternatively, the second network device may also perform resource measurement by using a cell as a granularity, to be specific, the second network device may collect statistics on each resource of each cell that belongs to the second network device. Therefore, the granularity of the obtained resource status information is the granularity of the cell.

Alternatively, the second network device may perform resource measurement by using a beam or a synchronization signal/physical broadcast channel block (SSB) as a granularity, to be specific, the second network device may collect statistics on each resource of each beam (or each SSB) of the second network device. Therefore, the granularity of the obtained resource status information is a granularity of the beam.

Alternatively, the second network device may perform resource measurement by using a slice as a granularity, to be specific, the second network device may collect statistics on each resource of each slice of the second network device. Therefore, the granularity of the obtained resource status information is a granularity of a slice.

In addition, the second network device may alternatively perform resource measurement by using a cell group as a granularity, to be specific, the second network device performs resource measurement for each cell group, where one cell group includes at least one cell belonging to the second network device, and grouping of the cell group of the second network device is not specifically limited herein. For another example, the second network device may alternatively perform resource measurement by using a granularity of a beam group, to be specific, the second network device performs resource measurement for each beam group, where one beam group includes at least one beam of the second network device, and grouping of the beam group of the second network device is not specifically limited herein. For another example, the second network device may alternatively perform resource measurement by using a granularity of a slice group, to be specific, the second network device performs resource measurement for each slice group, where one slice group includes at least one slice of the second network device, and grouping of the slice group of the second network device is not specifically limited herein.

Certainly, the second network device may alternatively perform resource measurement by using another granularity such as a BWP granularity. Granularities that may be used when the second network device performs resource measurement are not listed one by one herein.

S802. The second network device sends resource status information to the first network device. Correspondingly, the first network device receives the resource status information sent by the second network device.

The second network device may send the resource status information to the first network device through an interface such as Xn, X2, F1, or E1. Alternatively, the second network device may forward the resource status information to the first network device through another device. For example, the second network device sends the resource status information to a first core network, the first core network forwards the resource status information to a second core network, and the second core network sends the resource status information to the first network device. For example, the second network device is a 5G base station. The first network device is a 4G base station. The second network device may send the resource status information to 5GC. The 5GC forwards the resource status information to EPC, and the EPC forwards the resource status information to the first network device.

S803. The first network device determines a resource usage status of the second network device based on the resource status information.

In embodiments of this disclosure, when reporting the resource status information to the first network device, the second network device may indicate an LBT-related resource, so that the first network device determines, based on the resource status information reported by the second network device, a resource that may be occupied by the second network device, and the like. In this way, the first network device may perform conversion on the resource usage status of the second network device, to obtain an accurate resource usage status, and in particular, have more accurate estimation on an estimated future resource usage status. When the first network device performs mobility load balance based on information such as a resource that is to be released by the second network device and a resource that may be occupied, accuracy of load balance may be improved. For example, the first network device may perform conversion on indicator values such as a radio resource, a quantity of RRC connections, and a quantity of activated UEs (It may also be understood as a quantity of UEs with data transmission) of the second network device based on the LBT-related resource of the second network device, so that a degree of falsely high indicators such as the radio resource, the quantity of RRC connections, and the quantity of activated UEs of the second network device may be reduced, the resource usage status of the second network device may be more accurately learned, and a handover threshold of the source network device may be properly adjusted.

In a possible embodiment, the resource measurement performed by the second network device may be triggered by the second network device, to be specific, the second network device actively performs measurement and reports the resource status information.

In another possible embodiment, before step S801, the first network device may send a request message to the second network device, where the request message is used to request the second network device to measure the resource usage status. In this embodiment, the resource measurement performed by the second network device is triggered by the request message sent by the first network device.

In an implementation, the request message sent by the first network device may be valid once, and the second network device performs a report after receiving the request message.

In another implementation, the request message sent by the first network device may be valid for a plurality of times, and the second network device may periodically perform a report after receiving the request message.

In another implementation, the request message sent by the first network device may be valid for a plurality of times, and the second network device perform a report based on some conditions/events after receiving the request message. For example, the measured resource meets a specific percentage.

Optionally, after receiving the request message, the second network device may start related measurement based on a requirement in the request message. If it is found that any resource in a report category cannot be measured, the second network device returns a resource status failure message to the first network device. Otherwise, a resource status response message is returned to the first network device. The resource status response message represents that each measurement is successfully started, and the measurement is not completed.

Optionally, the request message may include a measurement ID.

The request message may further include a report category list. The report category may indicate which types of resources need to be measured and sent reports, for example, an air interface resource (Physical Resource Block or Radio resource status) or a transport layer (TNL) resource (Transparent Network Layer Capacity), a hardware resource (Hardware Capacity Indicator), an available slice capacity, a quantity of activated UEs, a quantity of RRC connections, an overall available resource (Composite Available Capacity), and the like. The report category may be a binary character string. Each bit represents a type of resource, and a value of a bit may indicate whether to measure and report the type of resource. For example, if a value of a bit is 1, it represents that a resource corresponding to the bit needs to be measured and reported, and 0 represents that a resource corresponding to the bit does not need to be measured and reported.

The air interface resource may be an uplink and downlink guaranteed bit rate (GBR)/a usage percentage of a non-guaranteed bit rate (Non-GBR), or the like. The transport layer resource may include a TNL provided in the uplink and downlink, an available TNL percentage in the uplink and downlink, and the like. The overall available resource may include a cell capacity level and an available percentage of a capacity (such as an available percentage of a total capacity in a cell and an available percentage of each SSB capacity). The hardware resource may include an available capacity of an uplink hardware and an available capacity of a downlink hardware, and the like. The available capacity of the slice may include an available capacity of each slice, and the like. The quantity of RRC connections may include the quantity of RRC connections, an available percentage of RRC connections, and the like.

The request message may further include a cell list (a resource of a specific cell needs to be measured), an SSB list (a beam in the cell needs to be measured), a slice list (a slice in the cell needs to be measured), and the like.

The request message may further include a reporting periodicity. For example, the reporting periodicity may be 500 milliseconds, so that the second network device may report once every 500 milliseconds. Optionally, if the request message does not carry the reporting periodicity, the second network device may report once.

Figure 8:
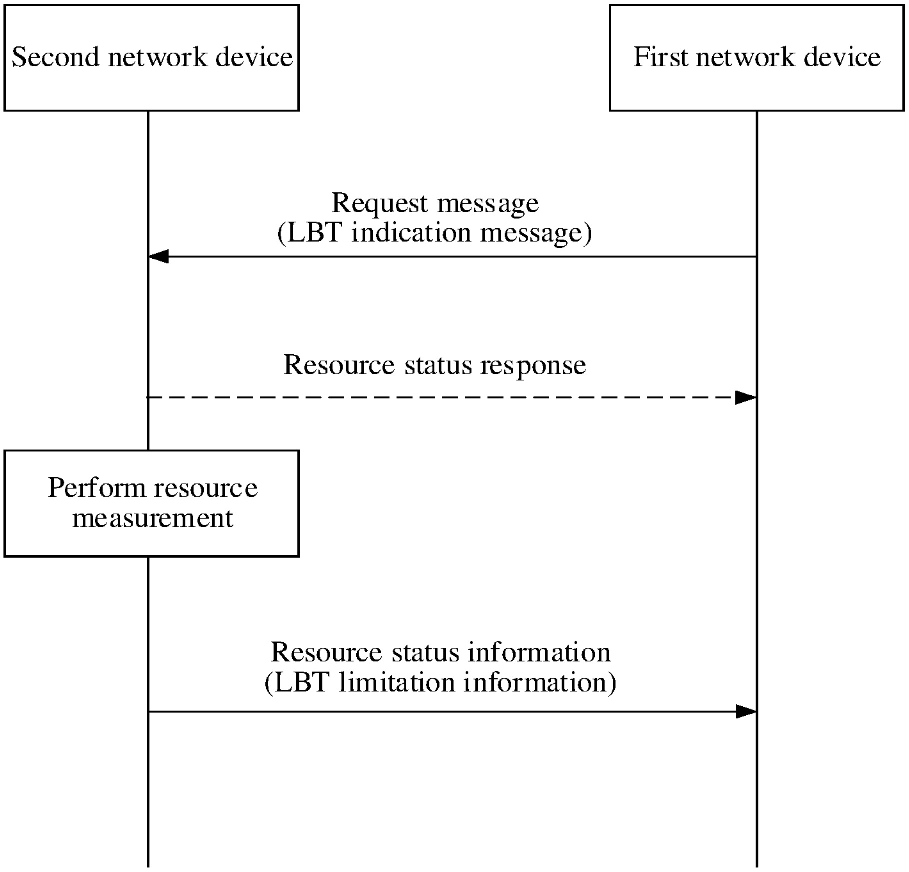
FIG. 8 is a schematic flowchart of a resource status information indication method according to an embodiment of this disclosure.
Figure 9:
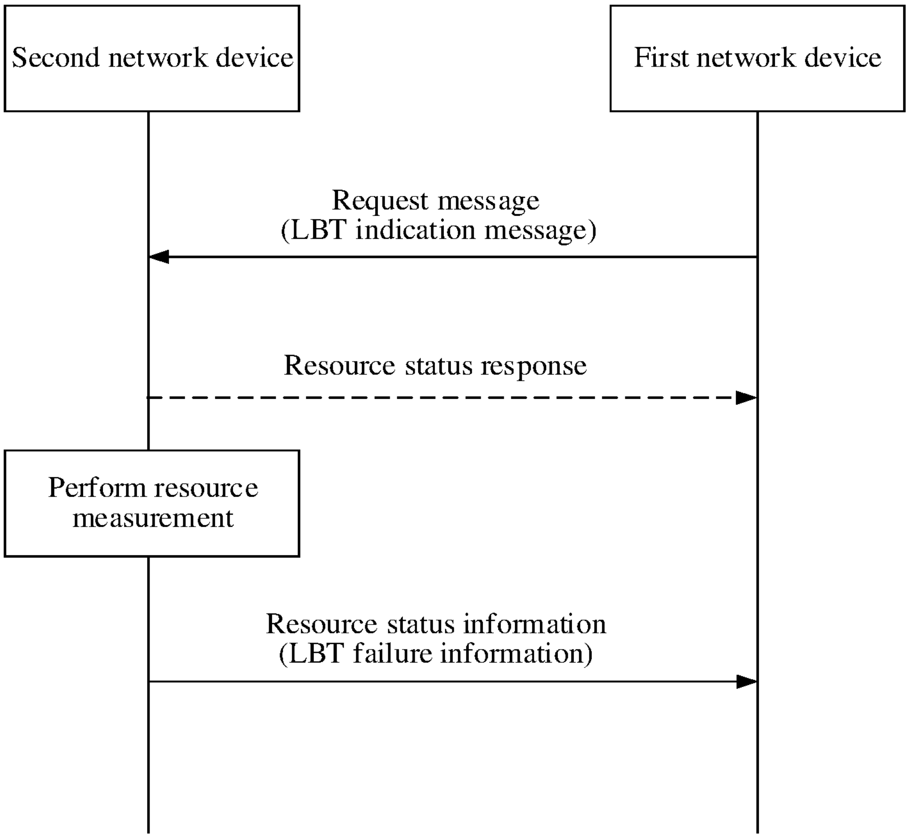
FIG. 9 is a schematic flowchart of another resource status information indication method according to an embodiment of this disclosure.

The request message may carry LBT indication information, and the LBT indication information indicates the second network device to measure and report an LBT-related resource. After receiving the request message, the second network device may collect statistics on the LBT-related resource. Correspondingly, the resource status information includes LBT-related resource information (such as LBT limitation information and LBT failure information). For example, as shown in FIG. 8 or FIG. 9.

In an implementation, the request message may carry first information that indicates to measure the LBT-related resource. For example, the request message may include the first information in the report category, to be specific, the LBT-related resource is used as a type of measured resource. For example, the report category may include one bit, and the bit indicates whether to measure and report the LBT-related resource. A value of the bit may indicate whether to measure and report the LBT-related resource. For example, if a value of one bit is 1, it represents that the LBT-related resource needs to be reported and measured, and 0 represents that the LBT-related resource does not need to be reported and measured.

In an example description, the LBT-related resource information may include LBT limitation information of the second network device, and the LBT limitation information indicates an LBT impact on resources available to the second network device.

Optionally, the LBT limitation information may be a comparison relationship between an offered resource of a first cell and an offered resource of a cell in which an LBT mechanism does not exist, and the first cell is a cell in which the LBT mechanism exists in the second network device. In an example, the LBT limitation information may be a difference between the offered resource of the first cell and the offered resource of the cell in which the LBT mechanism does not exist. For example, the LBT limitation information is N %, where N is a number greater than 0 and not greater than 100, representing that the offered resource of the first cell is N % of the offered resource of the cell in which the LBT mechanism does not exist. Using 80% as an example, the LBT limitation information may be 80%, representing that the offered resource of the first cell is 80% of the offered resource of the cell in which the LBT mechanism does not exist. For another example, the LBT limitation information is n/m, where both n and m are positive integers, and n is less than m, representing that the offered resource of the first cell is n/m of the offered resource of the cell in which the LBT mechanism does not exist. Using ⅔ as an example, the LBT limitation information may be ⅔, representing that the offered resource of the first cell is ⅔ of the offered resource of the cell in which the LBT mechanism does not exist.

In a possible implementation, the second network device may determine the LBT limitation information based on historical information.

Because a resource of a cell (for example, an NR-U cell) in which the LBT mechanism exists needs LBT contention, offered and available resources are fewer than those of a cell (for example, an NR cell) in which the LBT mechanism does not exist. In the foregoing manner, the second network device may perform conversion on the offered resources, and notify the first network device of a conversion result, so that the first network device may obtain an accurate resource usage status, and in particular, have more accurate estimation on a future estimated resource usage status. For example, the first network device may perform conversion on indicator values such as a radio resource, a quantity of RRC connections, and a quantity of UEs of the second network device based on a conversion result, so that a degree of falsely high indicators such as the radio resource, the quantity of RRC connections, and the quantity of UEs of the second network device may be reduced, and a handover threshold of the source network device may be properly adjusted.

It should be noted that in embodiments of this disclosure, "the offered resource" may be understood as all available resources of the network device, namely, the offered resource, or may be understood as a resource that is not occupied by the terminal device, namely, an available resource of the network device. It may be understood that the "offered resource" may also be referred to as the "available resource".

In another example description, the LBT-related resource information may include LBT failure information of the second network device, and the LBT failure information indicates an LBT failure status.

Optionally, the LBT failure information may indicate a level at which continuous LBT failures occur under the second network device. For example, the second network device may determine the level at which continuous LBT failures occur based on a quantity of times that continuous LBT failures occur. In an implementation, the levels of continuous LBT failures may include three levels: mild, moderate, and severe. Each level corresponds to a range of a quantity of times. The second network device may determine a corresponding level based on the range of the quantity of times in which the quantity of times that continuous LBT failures occur, and notify the first network device of the level. The first network device may perform conversion on the resource of the second network device based on the level.

In the foregoing manner, the second network device may notify the first network device of the level at which continuous LBT failures occur. In this way, the first network device may perform conversion on the resource of the second network device, to obtain an accurate resource usage status, and in particular, have more accurate estimation of a future estimated resource usage status. For example, the first network device may perform conversion on indicator values such as a radio resource, a quantity of RRC connections, and a quantity of UEs of the second network device based on continuous LBT failures that occur, so that a degree of falsely high indicators such as the radio resource, the quantity of RRC connections, and the quantity of UEs of the second network device may be reduced, and a handover threshold of the source network device may be properly adjusted.

The LBT failure information may also indicate a quantity of times that continuous LBT failures occur under the second network device. In the foregoing manner, the first network device may determine, based on the quantity of times that continuous LBT failures occur, the level at which continuous LBT failures occur, to perform conversion on the resource of the second network device, and obtain an accurate resource usage status, in particular, have more accurate estimation of a future estimated resource usage status.

The LBT failure information may also indicate a level at which an LBT failure occurs under the second network device. For example, the second network device may determine, based on a quantity of times that the LBT failure occurs, the level of the LBT failure. In an implementation, the level of the LBT failure may include three levels: mild, moderate, and severe. Each level corresponds to a range of a quantity of times. The second network device may determine a corresponding level based on the range of the quantity of times in which the quantity of times that the LBT failure occurs, and notify the first network device of the level. The first network device may perform conversion on the resource of the second network device based on the level.

In the foregoing manner, the second network device may notify the first network device of the level at which the LBT failure occurs. In this way, the first network device may perform conversion on the resource of the second network device, to obtain an accurate resource usage status, and in particular, have more accurate estimation of a future estimated resource usage status. For example, the first network device may perform conversion on indicator values such as a radio resource, a quantity of RRC connections, and a quantity of UEs of the second network device based on the LBT failure that occurs, so that a degree of falsely high indicators such as the radio resource, the quantity of RRC connections, and the quantity of UEs of the second network device may be reduced, and a handover threshold of the source network device may be properly adjusted.

The LBT failure information may also indicate a quantity of times that the LBT failure occurs under the second network device. In the foregoing manner, the first network device may determine, based on the quantity of times that the LBT failure occurs, the level at which the LBT failure occurs, to perform conversion on the resource of the second network device, and obtain an accurate resource usage status, in particular, have more accurate estimation of a future estimated resource usage status.

In addition, the LBT failure information may further include at least one of the following information: an RSSI measured by the second network device, an RSSI measured by a terminal device that accesses the second network device, a CO average value, and a probability that channel occupation is higher than the CO average value.

In still another example description, the LBT-related resource information may also include the LBT limitation information of the second network device and the LBT failure information of the second network device.

In an example description, it is assumed that the first network device indicates, in a report category of the request message, the second network device to measure and report a radio usage status, a quantity of RRC connections, and an LBT-related resource. The resource status information sent by the second network device to the first network device may be shown in Table 1.

TABLE 1

| |
|---|
| Radio usage status |
| Quantity of RRC connections |
| LBT-related resource |
| >LBT limitation information |
| >LBT failure information |

The radio usage, the quantity of RRC connections, and the LBT-related resource are in a parallel structure. The LBT limitation information and the LBT failure information are lower-level subdirectories of the LBT-related resource.

In another implementation, the request message may carry second information that indicates the LBT-related resources of the N types of resources measured by a measurement device, where N is an integer greater than 0. For example, the second information may indicate the second network device to consider an LBT factor when measuring the N types of resources, where the N types of resources may be resources indicated by the report category carried in the request message. Optionally, the second information may be implicit, or may be explicit. This is not limited herein.

After receiving the request message, the second network device may determine, for each type of resource, a quantity of LBT-related resources in the type of resource. Correspondingly, the LBT-related resource information may include: the LBT-related resource information of the N types of resources. N is an integer greater than 0, and LBT-related resource information of a first-type resource in the N types of resources includes at least one of the following information: LBT limitation information of the first-type resource and LBT failure information of the first-type resource, where the LBT limitation information of the first-type resource indicates a degree of an LBT impact on the first-type resource of the second network device, and the LBT failure information indicates an LBT failure status of the first-type resource of the second network device.

For example, the LBT limitation information of the first-type resource may be a comparison relationship between a first-type resource that can be offered by a first cell and a first-type resource that can be offered by a cell in which an LBT mechanism does not exist. The first cell is a cell in which the LBT mechanism exists in the second network device. In a possible implementation, the second network device may determine the LBT limitation information of the first-type resource based on historical information.

It should be noted that in embodiments of this disclosure, "an offered first-type resource" may be understood as all available first-type resources of the network device, namely, the offered first-type resource, or may be understood as a first-type resource that is not occupied by the terminal device, namely, an available first-type resource of the network device. It may be understood that the "offered first-type resource" may also be referred to as the "available first-type resource".

The LBT failure information of the first-type resource may indicate a level at which continuous LBT failures occur on the first-type resource of the second network device.

The LBT failure information may indicate a quantity or a proportion of first-type resources on which continuous LBT failures occur under the second network device; or the LBT failure information may indicate a level at which an LBT failure occurs on the first-type resource of the second network device; or the LBT failure information may indicate a quantity or a proportion of first-type resources on which an LBT failure occurs under the second network device.

Optionally, measurement parameters such as an air interface resource, a transport layer resource, an overall available resource, a hardware resource, an available capacity of a slice, a quantity of activated UEs, and a quantity of RRC connections may be separately used as a resource category. Alternatively, a plurality of measurement parameters may be used as a resource category. For example, an air interface resource and a transport layer resource are used as a resource category. For another example, a quantity of RRC connections, a hardware resource, and an overall available resource are used as a resource category.

In an example description, it is assumed that the first network device indicates, in the report category of the request message, the second network device to measure and report the radio usage status and the quantity of RRC connections, and carries the second information indicating that the LBT factor is considered. The resource status information sent by the second network device to the first network device may be shown in Table 2.

TABLE 2

| |
|---|
| Radio usage status |
| >Information elements included in a current protocol |
| >LBT-related resource |
| >> LBT limitation information |
| >> LBT failure information |
| Quantity of RRC connections |
| >Information elements included in a current protocol |
| >LBT-related resource |
| >> LBT limitation information |
| >> LBT failure information |

The radio usage status and the quantity of RRC connections are in a parallel relationship. The LBT-related resource and the information elements included in the current protocol are in a parallel relationship. The LBT limitation information and the LBT failure information are lower-level subdirectories of the LBT-related resource.

A lot of resources used in a network device in which an LBT mechanism exists are different from a lot of resources used in a network device in which the LBT mechanism does not exist. In the foregoing implementation, an LBT factor is considered for each type of resource, so that accuracy of a resource measurement report may be improved.

If the network device receives a large quantity of continuous LBT failure indications in a short period of time, it may be that a large quantity of terminal devices send data at a same moment. Because these terminal devices are close to each other, a resource cannot be obtained by contention. Based on an existing mechanism, a terminal device that fails in contention performs LBT again after a period of time. If some terminal devices move to other locations, interference between the terminal devices is reduced, and some terminal devices may successfully perform LBT, and access the network device. In embodiments of this disclosure, a transmit side network device indicates the LBT-related information, so that a receiving side network device may have a more accurate evaluation on a future resource usage status of the transmitting side network device, and the receiving side network device may more accurately obtain a load of the transmitting side network device. This improves accuracy of network load balance.

Figure 10:
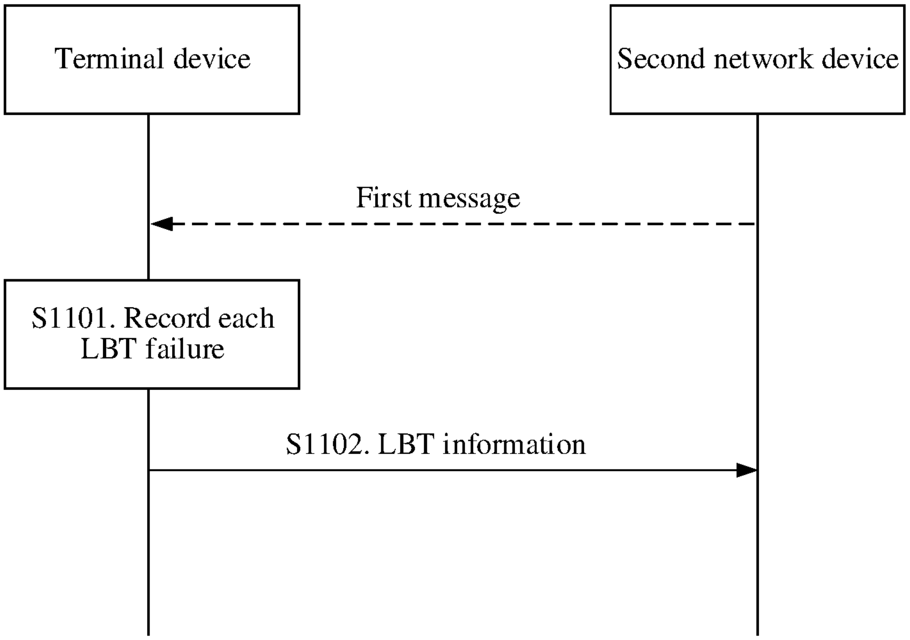
FIG. 10 is a schematic flowchart of another communication method according to an embodiment of this disclosure.

Embodiment 2: Embodiments of this disclosure further provide a communication method. As shown in FIG. 10, the method may specifically include the following steps.

S1101. A terminal device records each LBT failure.

S1102. The terminal device sends LBT information to a second network device, where the LBT information indicates a quantity of times of the LBT failures. Correspondingly, the second network device receives the LBT information.

In an implementation, the terminal device may report the quantity of LBT failures in a time periodicity to the second network device. In the implementation, the LBT information may include the quantity of LBT failures.

For example, the time periodicity may be indicated by the second network device, or may be specified in a protocol. In an implementation, the time periodicity may be a measurement periodicity of continuous LBT failures.

When the terminal device reports the quantity of LBT failures in the time periodicity, the quantity of LBT failures may exceed a threshold, or may not exceed a threshold. This is not specifically limited herein.

In an embodiment, if the quantity of LBT failures in the time periodicity is greater than or equal to the threshold, the terminal device may retain a record of the quantity of LBT failures. To be specific, if the quantity of LBT failures in the time periodicity is greater than or equal to the threshold, the terminal device may not clear the recorded quantity of LBT failures.

Optionally, the LBT information further includes channel information during each LBT failure, for example, an RSSI and a CO average value. In the foregoing manner, the second network device may better learn about the LBT failure status of the terminal device.

In an implementation, the terminal device may send the LBT information under an indication of the second network device.

For example, the second network device sends a first message to the terminal device. The first message may indicate to report the quantity of LBT failures. Correspondingly, the LBT information sent by the terminal device to the second network device includes the quantity of LBT failures.

For example, the first message may display and indicate to report the quantity of LBT failures. For example, the first message may carry a first indication, and the first indication is a first state, where when the first indication is the first state, the first indication indicates to report the quantity of LBT failures, and when the first indication is a second state, the first indication indicates to report continuous LBT failures.

Correspondingly, if the first indication is the second state, the terminal device may report continuous LBT failures to the second network device.

Alternatively, the first message may implicitly indicate to report the quantity of LBT failures.

In some embodiments, the terminal device may report the LBT information to the second network device through RRC signaling. Integrity of the LBT information may be ensured in the foregoing manner.

Optionally, the terminal device may report continuous LBT failures to the second network device through MAC CE signaling, to indicate that continuous LBT failures occur in the second network device.

Alternatively, the terminal device may report the quantity of continuous LBT failures to the second network through the RRC signaling.

In a possible implementation, the terminal device may alternatively send an LBT failure indication to the second network device when the LBT failure occurs. The LBT failure indication indicates that the LBT failure occurs. In the implementation, the LBT information may include the LBT failure indication.

In embodiments of this disclosure, the terminal device reports a specific quantity of times of LBT failures and channel details when the LBT fails, so that the network device further learns a status of an LBT channel, and adjusts resource scheduling more effectively.

It should be understood that the method in Embodiment 1 and the method in Embodiment 2 may be separately used as one independent solution for implementation, or may be combined as one solution for implementation.

When the method described in Embodiment 1 and the method described in Embodiment 2 are combined as one solution for implementation, load balance performed by various network elements in a network may be more practical, thereby bringing a better communication service to the terminal device.

Figure 11:
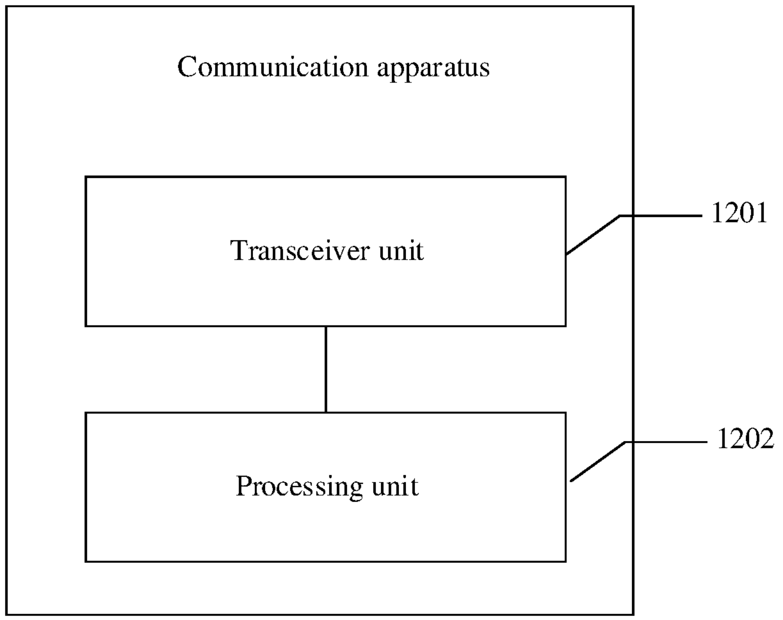
FIG. 11 is a schematic diagram of a structure of a communication apparatus according to an embodiment of this disclosure.

Based on a same inventive concept as the method embodiment, embodiments of this disclosure provide a communication apparatus. A structure of the apparatus may be shown in FIG. 11, and includes a transceiver unit 1201 and a processing unit 1202.

In a specific implementation, the apparatus may be specifically configured to implement the method performed by the first network device in the embodiments shown in FIG. 7 to FIG. 9. The apparatus may be the first network device, or may be a chip or a chip set in the first network device, or a chip or a part of a chip or a chip used to perform a related method function. The transceiver unit 1201 is configured to receive resource status information from a second network device, where the resource status information includes LBT-related resource information. The processing unit 1202 is configured to determine a resource usage status of the second network device by using the resource status information.

For example, the LBT-related resource information includes at least one of the following information: LBT limitation information of the second network device and LBT failure information of the second network device, where the LBT limitation information indicates an LBT impact on an available resource of the second network device, and the LBT failure information indicates an LBT failure status.

For example, the LBT limitation information is a comparison relationship between an offered resource of a first cell and an offered resource of a cell in which an LBT mechanism does not exist, and the first cell is a cell in which the LBT mechanism exists in the second network device.

For example, the LBT failure information indicates a level at which continuous LBT failures occur under the second network device.

Alternatively, the LBT failure information includes: a quantity of times that continuous LBT failures occur under the second network device.

Alternatively, the LBT failure information indicates a level at which an LBT failure occurs under the second network device.

Alternatively, the LBT failure information includes: a quantity of times that an LBT failure occurs under the second network device.

For example, the LBT failure information further includes at least one of the following information: a received signal strength indicator measured by the second network device, a received signal strength indicator measured by a terminal device that accesses the second network device, a channel occupation average value, and a probability that channel occupation is higher than the channel occupation average value.

Optionally, the transceiver unit 1201 is further configured to: before receiving the resource status information from the second network device, send a request message to the second network device, where the request message is used to request the second network device to measure the resource usage status, the request message carries first information, and the first information indicates to measure an LBT-related resource of the second network device.

For example, the LBT-related resource information includes: LBT-related resource information of N types of resources, where N is an integer greater than 0, and LBT-related resource information of a first-type resource in the N types of resources includes at least one of the following information: LBT limitation information of the first-type resource and LBT failure information of the first-type resource, where the LBT limitation information of the first-type resource indicates a degree of an LBT impact on the first-type resource of the second network device, and the LBT failure information indicates an LBT failure status of the first-type resource of the second network device.

For example, the LBT limitation information of the first-type resource is a comparison relationship between the first-type resource that can be offered by a first cell and the first-type resource that can be offered by a cell in which an LBT mechanism does not exist.

For example, the LBT failure information of the first-type resource indicates a level at which continuous LBT failures occur on the first-type resource of the second network device.

Alternatively, the LBT failure information indicates a quantity or a proportion of first-type resources on which continuous LBT failures occur under the second network device; or the LBT failure information indicates a level at which an LBT failure occurs on the first-type resource of the second network device; or the LBT failure information indicates a quantity or a proportion of first-type resources on which an LBT failure occurs under the second network device.

Optionally, the transceiver unit 1201 is further configured to: before receiving the resource status information from the second network device, send a request message to the second network device, where the request message is used to request the second network device to measure the resource usage status, the request message carries second information, and the second information indicates the second network device to measure LBT-related resources of the N types of resources.

For example, the N types of resources include at least one of the following resources: an air interface resource, a transport layer resource, a hardware resource, an available capacity of a slice, a quantity of activated terminal devices, a quantity of RRC connections, and an overall available resource.

Optionally, a granularity of the resource status information is a cell granularity, a network device granularity, a beam granularity, or a slice granularity.

In another specific implementation, the apparatus may be specifically configured to implement the method performed by the second network device in the embodiments shown in FIG. 7 to FIG. 10. The apparatus may be the second network device, or may be a chip or a chip set in the second network device, or a chip or a part of a chip or a chip used to perform a related method function. The processing unit 1202 is configured to perform resource measurement. The transceiver unit 1201 is configured to send resource status information to a first network device, where the resource status information includes LBT-related resource information.

For example, the LBT-related resource information includes at least one of the following information: LBT limitation information of the second network device and LBT failure information of the second network device, where the LBT limitation information indicates an LBT impact on an available resource of the second network device, and the LBT failure information indicates an LBT failure status.

For example, the LBT limitation information is a comparison relationship between an offered resource of a first cell and an offered resource of a cell in which an LBT mechanism does not exist, and the first cell is a cell in which the LBT mechanism exists in the second network device.

For example, the LBT failure information indicates a level at which continuous LBT failures occur under the second network device.

Alternatively, the LBT failure information includes: a quantity of times that continuous LBT failures occur under the second network device.

Alternatively, the LBT failure information indicates a level at which an LBT failure occurs under the second network device.

Alternatively, the LBT failure information includes: a quantity of times that an LBT failure occurs under the second network device.

For example, the LBT failure information further includes at least one of the following information: a received signal strength indicator measured by the second network device, a received signal strength indicator measured by a terminal device that accesses the second network device, a channel occupation average value, and a probability that channel occupation is higher than the channel occupation average value.

Optionally, the transceiver unit 1201 is further configured to: before the processing unit 1202 performs resource measurement, receive a request message from the first network device, where the request message is used to request the second network device to measure the resource usage status, the request message carries first information, and the first information indicates to measure an LBT-related resource of the second network device.

For example, the LBT-related resource information includes: LBT-related resource information of N types of resources, where N is an integer greater than 0, and LBT-related resource information of a first-type resource in the N types of resources includes at least one of the following information: LBT limitation information of the first-type resource and LBT failure information of the first-type resource, where the LBT limitation information of the first-type resource indicates a degree of an LBT impact on the first-type resource of the second network device, and the LBT failure information indicates an LBT failure status of the first-type resource of the second network device.

For example, the LBT limitation information of the first-type resource is a comparison relationship between the first-type resource that can be offered by a first cell and the first-type resource that can be offered by a cell in which an LBT mechanism does not exist.

For example, the LBT failure information of the first-type resource indicates a level at which continuous LBT failures occur on the first-type resource of the second network device.

Alternatively, the LBT failure information indicates a quantity or a proportion of first-type resources on which continuous LBT failures occur under the second network device.

the LBT failure information indicates a level at which an LBT failure occurs on the first-type resource of the second network device; or the LBT failure information indicates a quantity or a proportion of first-type resources on which an LBT failure occurs under the second network device.

Optionally, the transceiver unit 1201 is further configured to: before the processing unit 1202 performs resource measurement, receive a request message from the first network device, where the request message is used to request the second network device to measure the resource usage status, the request message carries second information, and the second information indicates the second network device to measure LBT-related resources of the N types of resources.

Optionally, the N types of resources include at least one of the following resources: an air interface resource, a transport layer resource, a hardware resource, an available capacity of a slice, a quantity of activated terminal devices, a quantity of RRC connections, and an overall available resource.

For example, a granularity of the resource status information is a cell granularity, a network device granularity, a beam granularity, or a slice granularity.

Optionally, the transceiver unit 1201 is further configured to: receive LBT information from a terminal device, where the LBT information includes a quantity of LBT failures in a time periodicity.

Optionally, the transceiver unit 1201 is further configured to: before receiving the LBT information from the terminal device, send a first message to the terminal device, where the first message indicates to report the quantity of LBT failures in the time periodicity.

For example, the LBT information further includes at least one of the following information: a received signal strength indicator and a channel occupation average value.

For example, the LBT information is carried in RRC signaling.

In another specific implementation, the apparatus may be specifically configured to implement the method performed by the terminal device in the embodiments shown in FIG. 8 to FIG. 10. The apparatus may be the terminal device, or may be a chip or a chip set in the terminal device, or a chip or a part of a chip or a chip used to perform a related method function. A processing unit 1202 is configured to record each LBT failure. The transceiver unit 1201 is configured to send LBT information to a second network device, where the LBT information includes a quantity of LBT failures in a time periodicity.

For example, the transceiver unit 1201 is further configured to: before sending the LBT information to the second network device, receive a first message from the second network device, where the first message indicates a quantity of LBT failures in the time periodicity.

For example, the first message carries a first indication, and the first indication is a first state, where when the first indication is the first state, the first indication indicates to report the quantity of LBT failures in the time periodicity, and when the first indication is a second state, the first indication indicates to report continuous LBT failures.

Optionally, the LBT information further includes at least one of the following information: a received signal strength indicator and a channel occupation average value.

Optionally, when sending the LBT information to the second network device, the transceiver unit 1201 is specifically configured to: send the LBT information to the second network device through radio resource control RRC signaling.

Optionally, when the LBT information is sent to the second network device, the quantity of LBT failures in the time periodicity is less than a threshold.

Optionally, the processing unit 1202 is further configured to: retain a record of the quantity of LBT failures if the quantity of LBT failures in the time periodicity is greater than or equal to the threshold.

Division of units in embodiments of this disclosure is an example, and is merely logical function division. During actual implementation, there may be other division manners. In addition, functional units in embodiments of this disclosure may be integrated into one processor, or may exist alone physically, or two or more units may be integrated into one unit. The integrated unit may be implemented in a form of hardware, or may be implemented in a form of a software functional unit. It may be understood that for functions or implementations of various units in embodiments of this disclosure, refer to related descriptions in the method embodiments.

Figure 12:
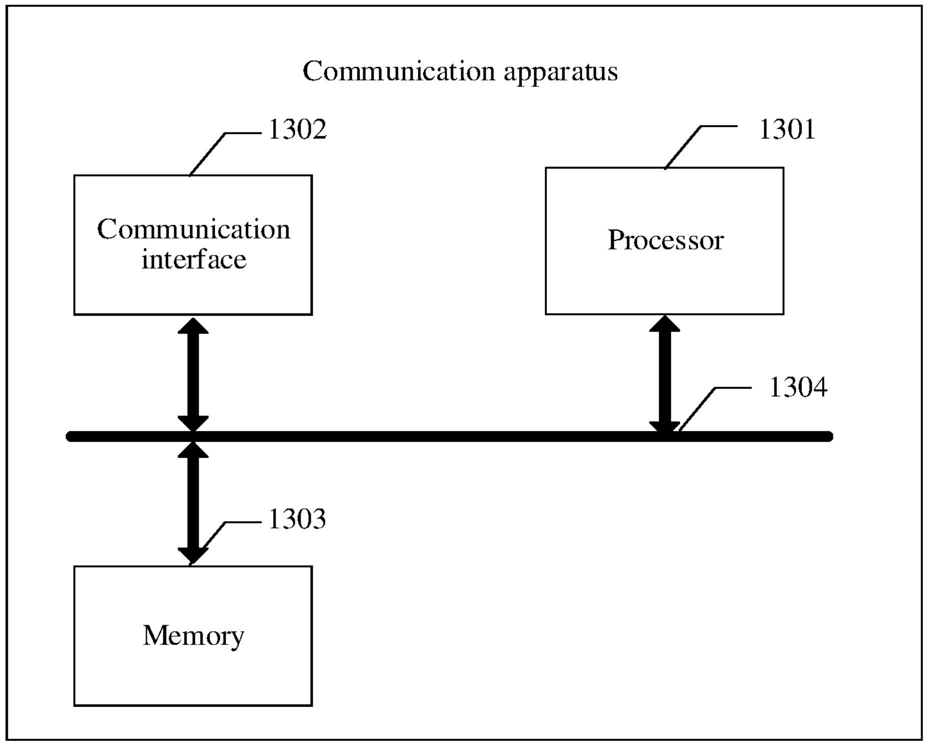
FIG. 12 is a schematic diagram of a structure of a communication apparatus according to an embodiment of this disclosure.

In a possible manner, the communication apparatus may be shown in FIG. 12. The communication apparatus may be a communication device or a chip in a communication device. The communication device may be a network device or a terminal device. The communication apparatus may include a processor 1301, a communication interface 1302, and a memory 1303. A processing unit 1202 may be the processor 1301. A transceiver unit 1201 may be the communication interface 1302.

The processor 1301 may be a central processing unit (CPU), a digital processing unit, or the like. The communication interface 1302 may be a transceiver, or may be an interface circuit such as a transceiver circuit, or may be a transceiver chip, or the like. The communication apparatus further includes: the memory 1303, configured to store a program executed by the processor 1301. The memory 1303 may be a non-volatile memory, for example, a hard disk drive (HDD) or a solid-state drive (SSD), or may be a volatile memory such as a random-access memory (RAM). The memory 1303 is any other medium that can carry or store expected program code in a form of an instruction structure or a data structure and that can be accessed by a computer, but is not limited thereto.

The processor 1301 is configured to execute the program code stored in the memory 1303, and is specifically configured to perform an action of the processing unit 1202. Details are not described herein again in this disclosure.

The communication interface 1302 is configured to perform an action of the transceiver unit 1201. Details are not described herein again in this disclosure.

A specific connection medium between the communication interface 1302, the processor 1301, and the memory 1303 is not limited in embodiments of this disclosure. In embodiments of this disclosure, in FIG. 12, the memory 1303, the processor 1301, and the communication interface 1302 are connected through a bus 1304. The bus is represented by a bold line in FIG. 12. A connection manner between other components is only an example for description, and is not limited thereto. The bus may be classified into an address bus, a data bus, a control bus, and the like. For ease of representation, only one thick line is used to represent the bus in FIG. 12, but this does not mean that there is only one bus or only one type of bus.

Embodiments of the present invention further provide a computer-readable storage medium, configured to store computer software instructions that need to be executed by the foregoing processor, and the computer software instructions include a program that needs to be executed by the foregoing processor.

A person skilled in the art is to understand that embodiments of this disclosure may be provided as a method, a system, or a computer program product. Therefore, this disclosure may take the form of hardware-only embodiments, software-only embodiments, or embodiments with a combination of software and hardware. In addition, this disclosure may use a form of a computer program product that is implemented on one or more computer-usable storage media (including but not limited to a disk memory, a CD-ROM, an optical memory, and the like) that include computer-usable program code.

This disclosure is described with reference to a flowchart and/or a block diagram of a method, a device (system), and a computer program product according to this disclosure. It should be understood that computer program instructions may be used to implement each process and/or each block in the flowchart and/or the block diagram and a combination of a process and/or a block in the flowchart and/or the block diagram. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this disclosure without departing from the protection scope of this disclosure. In this case, if the modifications and variations made to this disclosure fall within the scope of the claims of this disclosure and equivalent technologies thereof, this disclosure is intended to include these modifications and variations.

What is claimed is:

1. A communication apparatus, which is a first network device or a chip for the first network device, the communication apparatus comprising at least one processor and a communication circuit; wherein the at least one processor is at least configured to:

receive resource status information from a second network device, wherein the resource status information comprises listen before talk (LBT)-related resource information, wherein the LBT-related resource information comprises LBT-related resource information of N types of resources, wherein N is an integer greater than 0, and the LBT-related resource information of a first-type resource in the N types of resources comprises LBT limitation information of the first-type resource, and the LBT limitation information of the first-type resource indicates a degree of an LBT impact on the first-type resource of the second network device, and the LBT limitation information of the first-type resource is a comparison relationship between the first-type resource that can be offered by a first cell and the first-type resource that can be offered by a cell in which an LBT mechanism does not exist; and determine a resource usage status of the second network device based on the resource status information.

2. The communication apparatus according to claim 1, wherein:

the LBT-related resource information further comprises at least one of the following information: LBT limitation information of the second network device or LBT failure information of the second network device, and the LBT limitation information indicates an LBT impact on an available resource of the second network device, and the LBT failure information indicates an LBT failure status, and wherein the LBT failure information comprises: a quantity of times that an LBT failure occurs under the second network device.

3. The communication apparatus according to claim 1, wherein the LBT-related resource information further comprises LBT failure information including at least one of the following information: a received signal strength indicator measured by the second network device, a received signal strength indicator measured by a terminal device that accesses the second network device, a channel occupation average value, or, a probability that channel occupation is higher than the channel occupation average value.

4. The communication apparatus according to claim 2, wherein before the receiving of the resource status information from the second network device, the at least one processor is further configured to:

send a request message to the second network device, wherein the request message is used to request the second network device to measure the resource usage status, the request message carries first information, and the first information indicates to measure an LBT-related resource of the second network device.

5. The communication apparatus according to claim 1, wherein the LBT-related resource information of the first-type resource in the N types of resources further comprises LBT failure information of the first-type resource, wherein the LBT failure information indicates an LBT failure status of the first-type resource of the second network device.

6. The communication apparatus according to claim 5, wherein;

the LBT failure information of the first-type resource indicates a level of failure at which LBT failures occur on the first-type resource of the second network device; or the LBT failure information indicates a quantity or a proportion of first-type resources on which LBT failures occur under the second network device; or the LBT failure information indicates a level of failure at which an LBT failure occurs on the first-type resource of the second network device; or the LBT failure information indicates a quantity or a proportion of first-type resources on which an LBT failure occurs under the second network device.

7. The communication apparatus according to claim 5, wherein before the receiving of the resource status information from the second network device, the at least one processor is further configured to:

send a request message to the second network device, wherein the request message is used to request the second network device to measure the resource usage status, the request message carries second information, and the second information indicates the second network device to measure LBT-related resources of the N types of resources.

8. The communication apparatus according to claim 5, wherein the N types of resources comprise at least one of the following resources: an air interface resource, a transport layer resource, a hardware resource, an available capacity of a slice, a quantity of activated terminal devices, a quantity of radio resource control (RRC) connections, or an overall available resource.

9. The communication apparatus according to claim 1, wherein a granularity of the resource status information is a cell granularity, a network device granularity, a beam granularity, or a slice granularity.

10. A communication apparatus, which is a second network device or a chip for the second network device, the communication apparatus comprising at least one processor and a communication circuit; wherein the at least one processor is at least configured to:

perform resource measurement; and send resource status information to a first network device, wherein the resource status information comprises listen before talk (LBT)-related resource information, wherein the LBT-related resource information comprises LBT-related resource information of N types of resources, wherein N is an integer greater than 0, and the LBT-related resource information of a first-type resource in the N types of resources comprises LBT limitation information of the first-type resource, and the LBT limitation information of the first-type resource indicates a degree of an LBT impact on the first-type resource of the second network device, and the LBT limitation information of the first-type resource is a comparison relationship between the first-type resource that can be offered by a first cell and the first-type resource that can be offered by a cell in which an LBT mechanism does not exist.

11. The communication apparatus according to claim 10, wherein the LBT-related resource information further comprises LBT limitation information of the second network device, wherein the LBT limitation information indicates an LBT impact on an available resource of the second network device.

12. The communication apparatus according to claim 10, wherein the LBT-related resource information further comprises LBT failure information including at least one of the following information: a received signal strength indicator measured by the second network device, a received signal strength indicator measured by a terminal device that accesses the second network device, a channel occupation average value, or, a probability that channel occupation is higher than the channel occupation average value.

13. A communication apparatus, which is a first network device or a chip for the first network device, the communication apparatus comprising at least one processor and a communication circuit; wherein the at least one processor is at least configured to:

receive resource status information from a second network device, wherein the resource status information comprises listen before talk (LBT)-related resource information; and determine a resource usage status of the second network device based on the resource status information; wherein:

the LBT-related resource information comprises at least one of the following information: LBT limitation information of the second network device or LBT failure information of the second network device;

the LBT limitation information indicates an LBT impact on an available resource of the second network device, and the LBT failure information indicates an LBT failure status; and the LBT-related resource information comprises at least the LBT limitation information of the second network device, the LBT limitation information is a comparison relationship between an offered resource of a first cell and an offered resource of a cell in which an LBT mechanism does not exist, and the first cell is a cell in which the LBT mechanism exists in the second network device.

14. The communication apparatus according to claim 13, wherein the LBT failure information further comprises at least one of the following information: a received signal strength indicator measured by the second network device, a received signal strength indicator measured by a terminal device that accesses the second network device, a channel occupation average value, or, a probability that channel occupation is higher than the channel occupation average value.

15. The communication apparatus according to claim 13, wherein before the receiving of the resource status information from the second network device, the at least one processor is further configured to: send a request message to the second network device, wherein the request message is used to request the second network device to measure the resource usage status, the request message carries first information, and the first information indicates to measure an LBT-related resource of the second network device.

16. The communication apparatus according to claim 13, wherein a granularity of the resource status information is a cell granularity, a network device granularity, a beam granularity, or a slice granularity.

* * * * *